United States Patent
Gonyou et al.

(10) Patent No.: US 11,492,972 B2
(45) Date of Patent: Nov. 8, 2022

(54) DIFFERENTIAL ALPHA VARIABLE AREA METERING

(71) Applicant: General Electric Company, Schenectady, NY (US)

(72) Inventors: Craig Alan Gonyou, Blanchester, OH (US); Robert Proctor, Mason, OH (US); Christopher Michael Thompson, West Chester, OH (US); Scott Alan Schimmels, Miamisburg, OH (US); Steven Douglas Johnson, Milford, OH (US)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 16/730,570

(22) Filed: Dec. 30, 2019

(65) Prior Publication Data

US 2021/0199051 A1 Jul. 1, 2021

(51) Int. Cl.
*F02C 7/00* (2006.01)
*F02C 7/18* (2006.01)

(52) U.S. Cl.
CPC .......... *F02C 7/18* (2013.01); *F05D 2260/201* (2013.01)

(58) Field of Classification Search
CPC ........ F01D 11/025; F01D 11/18; F01D 11/24; F04D 15/0263; F04D 29/02; F04D 26/464; F05D 2300/502; F05D 2300/50212; F05D 2260/201; F05B 2280/5003; F05B 2280/50032; F02C 7/18
See application file for complete search history.

(56) References Cited

U.S. PATENT DOCUMENTS

| | | | | |
|---|---|---|---|---|
| 3,362,636 A | * | 1/1968 | Miyawaki | F16T 1/08 236/59 |
| 3,386,065 A | * | 5/1968 | Algino | H01H 37/36 60/527 |
| 3,446,286 A | * | 5/1969 | Kreidler | A62C 35/605 285/19 |
| 3,542,289 A | * | 11/1970 | Ojala | G05D 23/1854 236/92 R |
| 3,814,313 A | * | 6/1974 | Beam, Jr. | G05D 23/275 415/12 |

(Continued)

FOREIGN PATENT DOCUMENTS

EP 3130763 A1 2/2017

*Primary Examiner* — Phutthiwat Wongwian
*Assistant Examiner* — Sherman D Manley
(74) *Attorney, Agent, or Firm* — Dority & Manning, P.A.

(57) ABSTRACT

An annular fluid flow control or metering device comprises: first and second annular plates disposed in an annular flow path, the first annular plate and second annular plates being made of different first and second materials, the first annular plate having a lower first coefficient of thermal expansion than a second coefficient of thermal expansion of the second annular plate, the first annular plate abutting or in contact with the second annular plate, the first annular plate including at least one first metering aperture, and the second annular plate being more thermally responsive than the first annular plate wherein the second annular plate being configured to radially grow and shrink to at least partly obstruct the at least one first metering aperture for metering or controlling a flow of fluid through the at least one first metering aperture.

11 Claims, 13 Drawing Sheets

(56) References Cited

U.S. PATENT DOCUMENTS

| | | | |
|---|---|---|---|
| 4,023,731 A | | 5/1977 | Patterson |
| 4,613,280 A | | 9/1986 | Tate |
| 4,730,982 A | | 3/1988 | Kervistin |
| 4,805,398 A | | 2/1989 | Jourdain et al. |
| 5,316,437 A | * | 5/1994 | Czachor ................ F01D 9/065 |
| | | | 415/115 |
| 6,116,852 A | | 9/2000 | Pierre et al. |
| 6,485,255 B1 | | 11/2002 | Care et al. |
| 6,672,072 B1 | | 1/2004 | Giffin |
| 8,133,014 B1 | * | 3/2012 | Ebert ................... F01D 11/025 |
| | | | 415/173.5 |
| 8,561,386 B2 | | 10/2013 | Mons |
| 8,678,753 B2 | | 3/2014 | Farrell |
| 8,684,275 B2 | | 4/2014 | Vafai et al. |
| 8,757,508 B2 | * | 6/2014 | Haasz ...................... F02C 6/08 |
| | | | 236/102 |
| 9,181,933 B2 | * | 11/2015 | Daly ...................... F03G 7/065 |
| 9,188,010 B2 | | 11/2015 | Jha et al. |
| 9,267,382 B2 | | 2/2016 | Szwedowicz et al. |
| 9,297,310 B2 | * | 3/2016 | Giri ......................... F02C 7/141 |
| 9,347,334 B2 | * | 5/2016 | Joe ............................. F01D 5/12 |
| 9,593,590 B2 | * | 3/2017 | Ebert ................... F01D 11/001 |
| 9,644,490 B2 | | 5/2017 | Joe et al. |
| 10,247,028 B2 | * | 4/2019 | Blaney ................... F01D 11/08 |

* cited by examiner

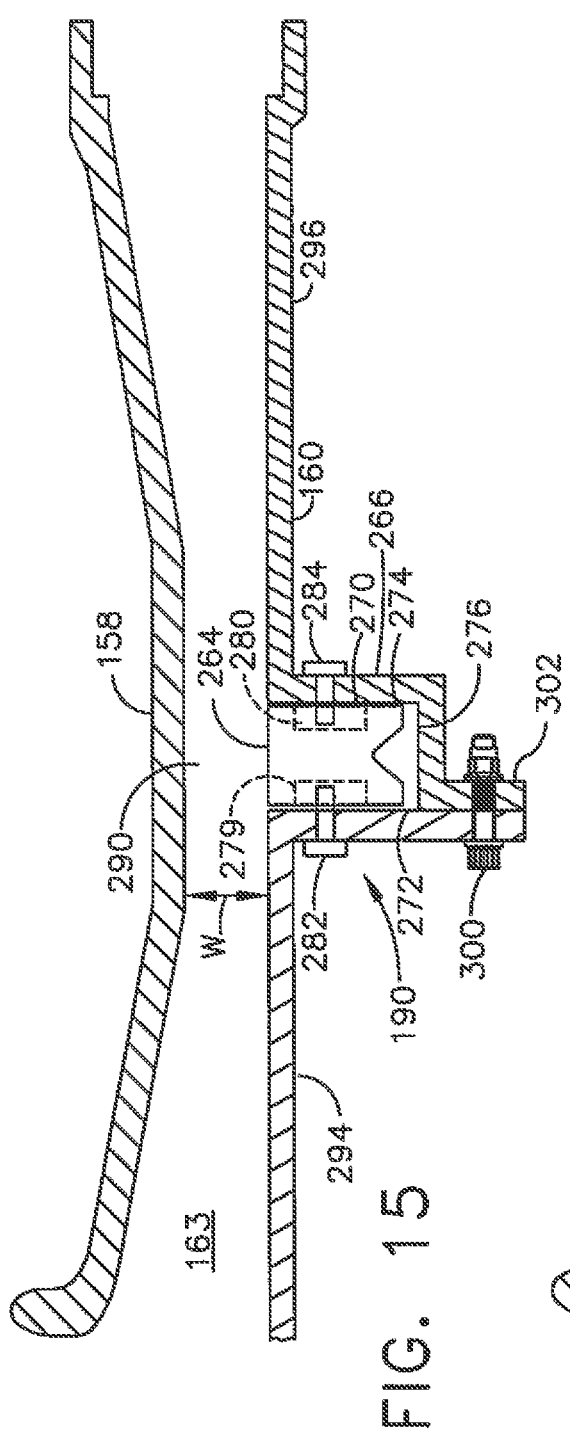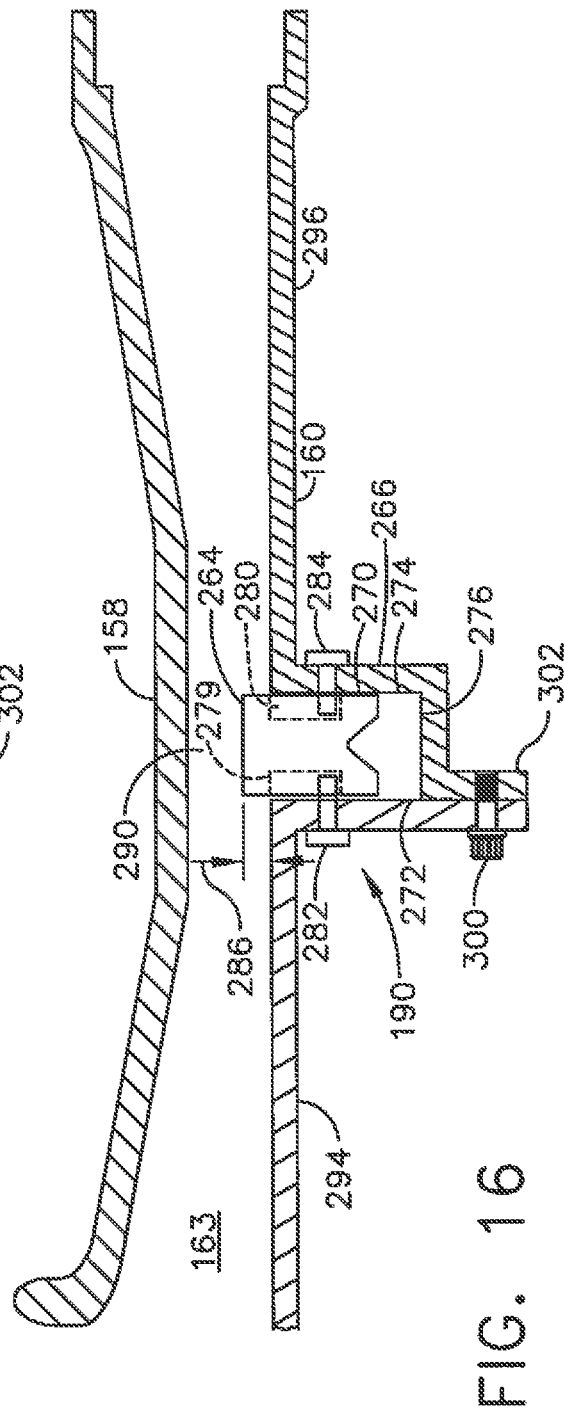

DIFFERENTIAL ALPHA VARIABLE AREA METERING

INTRODUCTION

The present invention relates generally to flow metering and, more specifically, to metering annular flows such as may be utilized in gas turbine engines.

BACKGROUND

Many devices and apparatus such as turbofan gas turbine engines use metered air flow such as for cooling. Various parts of gas turbine engines may require cooling or heating provided by cool or hot air such as a high pressure turbine (HPT) in a gas turbine engine. The HPT is subject to hot combustion gases discharged from a combustor and various components of the HPT are typically cooled by bleeding a portion of pressurized air from a compressor. Any air used for turbine cooling is lost from the combustion process and, therefore, may reduce overall efficiency of the engine. Each turbine stage includes a row of turbine rotor blades extending radially outwardly from a supporting rotor disk with the radially outer tips of the blades being mounted inside a surrounding turbine shroud. Typically, turbine rotor blades of at least the first turbine stage are cooled by a portion of the pressurized air from the compressor.

The typical turbofan aircraft engine initially operates at a low power, idle mode, and then undergoes an increase in power for takeoff and climb operation. Upon reaching cruise at the desired altitude of flight, the engine is operated at a lower or intermediate power setting. The engine is also operated at lower power as the aircraft descends from altitude and lands, following which thrust reverse operation is typically employed with the engine again operated at a higher power setting. In the various transient modes of operation of the engine where the power increases or decreases, the turbine blades heat up and cool down respectively.

The HPT blades are typically cooled using a portion of high pressure compressor discharge air (also known as compressor discharge pressure or CDP air) bled after the last stage of the compressor. CDP air can either be pre-OGV (outlet guide vane) or post-OGV air. Post-OGV air is higher in pressure due to recovery of dynamic head. The air is suitably channeled through internal cooling channels inside the hollow blades and discharged through the blades in various rows of film cooling holes from the leading edge and aft therefrom, and also typically including a row of trailing edge outlet holes or slots on the airfoil. This blade cooling air bypasses the combustion process and, therefore, further reduces efficiency of the engine.

Blade cooling air is gathered and transferred from static portions of the engine to rotating disks supporting the hollow blades. In order to efficiently transfer the blade cooling air, tangential and/or radial flow inducers have been designed, usually in the form of a circumferentially disposed array of nozzles to accelerate and turn the cooling flow so as to tangentially or radially inject the cooling flow into rotating cavities at a rotational or tangential speed and direction lower, equal to, or greater than that of the rotor. Each set of inducers injects the cooling air flow in a direction that is in the direction of rotation of the rotor.

One method to reduce cooling is to reduce cooling flow at low power settings thereby improving efficiency. The traditional approach for modulating physical airflow through an orifice or passage is by increasing and decreasing the flow area at an orifice. Modulating airflow is typically accomplished using high cost and high weight valves in the secondary air systems of modern aircraft engines. This is often done for cooling circuits that are modulated back at cruise to save secondary cooling air.

It is desirable to reduce or eliminate these valves from these cooling circuits and reduce or eliminate associated controls, actuators, and complexity to work in the hot under cowl environment. Accordingly, it is also desirable to provide a gas turbine engine having improved blade cooling control and efficiency.

SUMMARY

In one aspect, an annular fluid flow control or metering device comprises: first and second annular plates disposed in an annular flow path, the first annular plate and second annular plates being made of different first and second materials, the first annular plate having a lower first coefficient of thermal expansion than a second coefficient of thermal expansion of the second annular plate, the first annular plate abutting or in contact with the second annular plate, the first annular plate including at least one first metering aperture, and the second annular plate being more thermally responsive than the first annular plate wherein the second annular plate being configured to radially grow and shrink to at least partly obstruct the at least one first metering aperture for metering or controlling a flow of fluid through the at least one first metering aperture.

In another aspect, an aircraft turbofan gas turbine engine comprises: a core engine or gas generator including a high pressure compressor, a combustor, and a high pressure turbine, one or more annular fluid flow control or metering devices disposed in one or more corresponding annular flowpaths in the core engine or gas generator, each of the metering devices including first and second annular plates disposed in an annular flow path, the first annular plate and second annular plates being made of different first and second materials, the first annular plate having a lower first coefficient of thermal expansion than a second coefficient of thermal expansion of the second annular plate, the first annular plate abutting or in contact with the second annular plate, the first annular plate including at least one first metering aperture, and the second annular plate being more thermally responsive than the first annular plate wherein the second annular plate being configured to radially grow and shrink to at least partly obstruct the at least one first metering aperture for metering or controlling a flow of fluid through the at least one first metering aperture.

BRIEF DESCRIPTION OF THE DRAWINGS

FIG. 15 is an axial cross-sectional illustration of the metering device in FIG. 14 in an open position.

FIG. 16 is an axial cross-sectional illustration of the metering device in FIG. 14 in a partially closed position.

DETAILED DESCRIPTION

Figure 1:
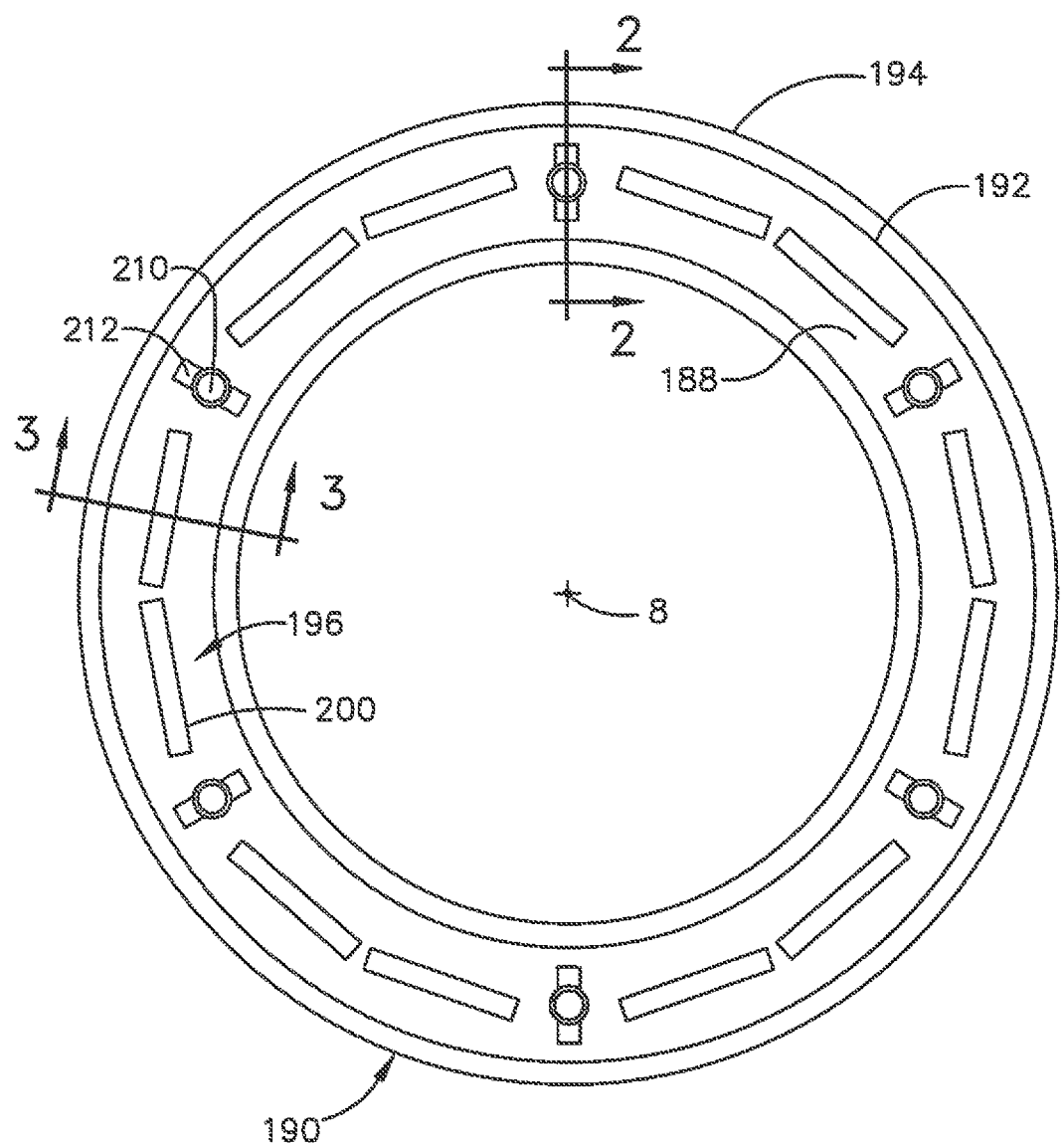
FIG. 1 is an axial sectional illustration of an exemplary passive variable area metering device suitable for use in an aircraft gas turbine engine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

The described embodiments of the present invention are directed to passive valve systems. For purposes of illustration, the present invention will be described with respect to a gas turbine engine which may be suitable for use to power aircraft. It will be understood, however, that the invention is not so limited and may have general applicability, including other mobile and non-mobile industrial, commercial, military, and residential applications such as aircraft, ships, railroad locomotives, off-road vehicles, and stationary powerplants. In fact, the passive valve system described herein may be utilized in any pipe, channel, duct, or conduit when a passive valve system may be advantageous.

As used herein, the term "forward" or "upstream" refers to moving in a direction toward the system inlet, or a component being relatively closer to the system inlet as compared to another component. The term "aft" or "downstream" used in conjunction with "forward" or "upstream" refers to a direction toward the rear or outlet of the system or being relatively closer to the system outlet as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Illustrated in FIGS. 1-5 is a first exemplary embodiment of an annular fluid flow control or metering device 190 for controlling or metering annular fluid flow through an annular flowpath 188. The metering device 190 is a differential coefficient of thermal expansion (alpha) variable area metering device 190 which may be used to meter fluid flow such as flow of air 191, illustrated herein as flowing in a downstream direction, through the annular flow path 188. First and second annular plates 192, 194 made of different first and second materials with different first and second coefficients of thermal expansion referred to herein as first and second alphas abut or are in contact. One material is a low alpha material and the other material is a relatively high alpha material such as metal. The first annular plate 192 is a low alpha material plate as illustrated herein and the second annular plate 194 is a high alpha material plate as illustrated herein. The first annular plate 192 may be upstream of the second annular plate 194 with respect to the flow of air 191, or in some configurations may be downstream of the second annular plate 194. The second annular plate 194 includes a second annular row 198 of second metering apertures 202 and, in the exemplary embodiment shown in FIG. 1, are radially disposed about a centerline axis 8. The first annular plate 192 may have a first annular row 196 of first metering apertures 200 and, in the exemplary embodiment of FIG. 1, are likewise radially disposed about the centerline axis 8. However, other arrangements of first and second metering apertures 200, 202, other than radially disposed around a centerline axis 8 are possible as well.

Thermally induced differential radial growth and shrinkage between the plates provide annular fluid flow control or metering through at least one of the metering apertures 200. The exemplary embodiments of the metering device 190 illustrated herein provide annular fluid flow control or metering through a plurality of the metering apertures 200. The second annular plate 194 is more thermally responsive than the first annular plate 192 and can radially grow and shrink to at least partly obstruct at least one of the first metering apertures 200 for metering or controlling a flow of fluid through the metering apertures in both plates. One of the first or second annular plates 192, 194, may be an existing wall or structure incorporated into an overall assembly with the other of the first or second annular plates 192, 194, superimposed thereon to form a two-layer structure as described herein. Alternatively, both first and second annular plates 192, 194 may be additional structures superimposed onto an overall assembly.

The contacting first and second annular plates 192, 194 in the embodiment of the variable area metering device 190 illustrated in FIGS. 1-5 are illustrated as full unsegmented rings. Guide pins 210 having a guide pin centerline axis 215 center the first annular plate 192 around the centerline axis 8 and provide concentricity between the first and second annular plates 192, 194. The guide pins 210 guide and permit differential radial growth and shrinkage between the plates. The guide pins 210 may also be used to retain the plates against each other in an abutting and sliding relationship permitting differential radial growth and shrinkage between the plates. To this end, the guide pins 210 may be fixed to or attached to the second annular plate 194 and extend through a radially extending slot 212 in the first annular plate 192. In other embodiments, the guide pins 210 may be fixed to or attached to the first annular plate 192 and extend through a slot in the second annular plate 194. The guide pins 210 help maintain the circumferential or angular relationship or alignment of the plates and alignment of the first and second metering apertures 200, 202.

Figure 2:
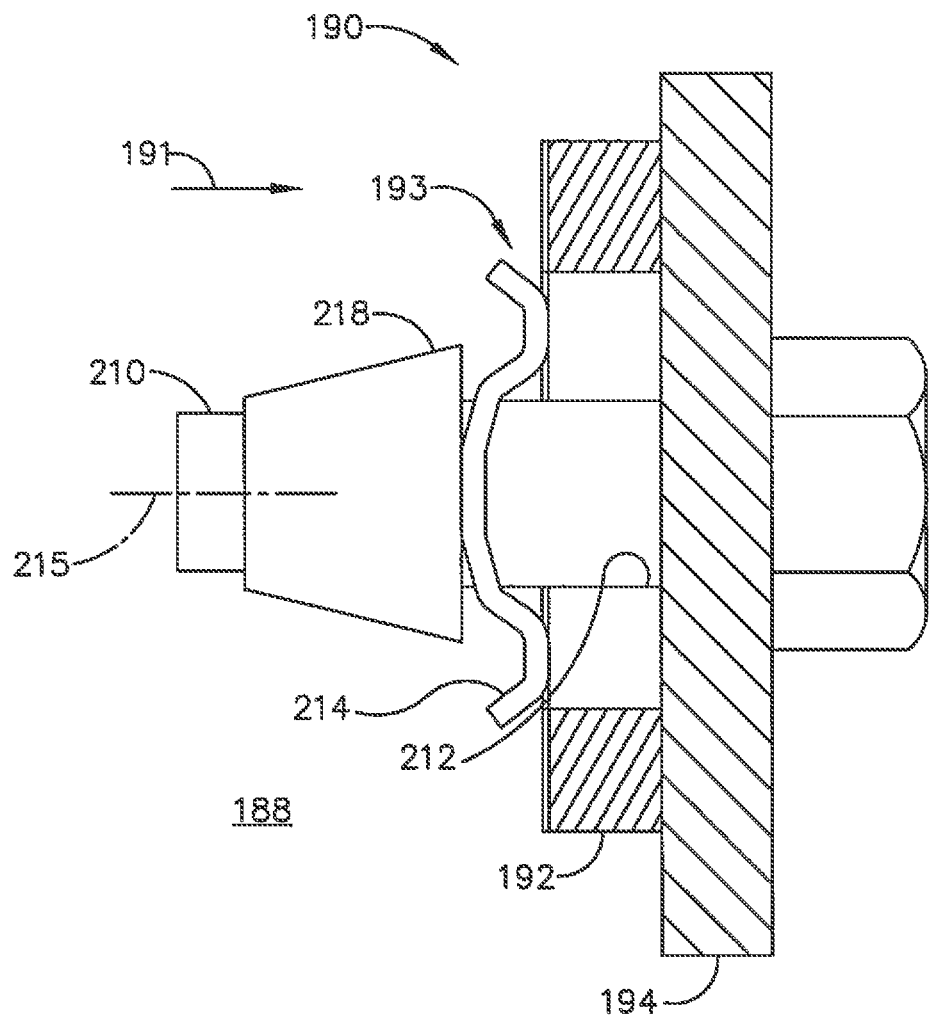
FIG. 2 is an enlarged axial sectional illustration of the metering device of FIG. 1 taken through section line 2-2.

Illustrated in FIG. 2 is a sliding bolted joint 193 slidingly clamping the first and second annular plates 192, 194 together. Compliant or flexible spring washers 214 may be placed over the guide pins 210 and be secured by a nut or other fastener 218 against the first annular plate 192 to help provide the sliding clamping function. The flexible spring washer 214 may be placed over the guide pin 210 and secured by a nut or other fastener 218. Securing the washer 214 to the guide pin 210 helps slidingly hold the plates together and provides a predetermined load to hold the plates together. Other types of retainers may be used in place of the pins and washers.

Figure 3:
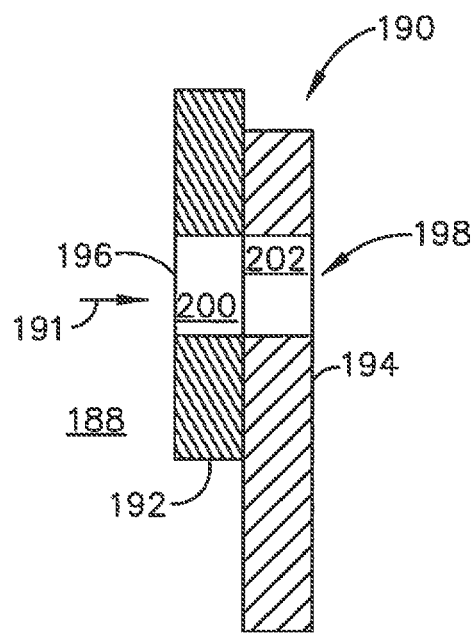
FIG. 3 is an axial sectional illustration of the metering device of FIG. 1 taken through section line 3-3 depicting a fully open position.

The contacting first and second annular plates 192, 194 and their respective first and second metering apertures 200, 202 are sized, and the metering apertures are positioned, to allow the metering apertures to at least partially overlap or be radially aligned at a first air temperature T1 of the air 191 through the annular flowpath 188 as illustrated in FIG. 3. The metering device 190 illustrated in FIG. 3 is in the fully open or high flow position with the first and second metering apertures 200, 202 fully overlapping.

Figure 4:
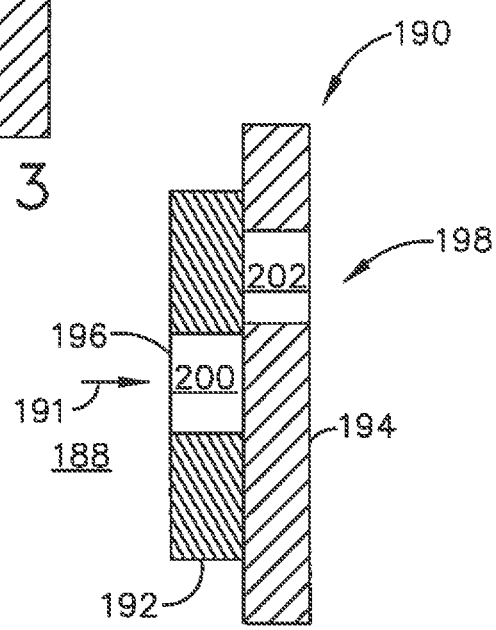
FIG. 4 is an axial sectional illustration of the metering device in FIG. 3 depicting a fully closed position.

The first and second metering apertures 200, 202 may be sized and positioned to allow the metering apertures to not overlap or not be radially aligned at a second air temperature T2 of the air 191 through the annular flowpath 188 as illustrated in FIG. 4. The metering device 190 illustrated in FIG. 4 is in the fully closed or a low flow position with the first and second metering apertures 200, 202 not overlapping. Variable flow through the variable area metering device 190 may be provided by the first and second metering apertures 200, 202 which may be fully open when the metering apertures fully overlap as illustrated in FIG. 3. The first and second metering apertures 200, 202 may be fully closed when the metering apertures do not overlap at all as illustrated in FIG. 4.

Figure 5:
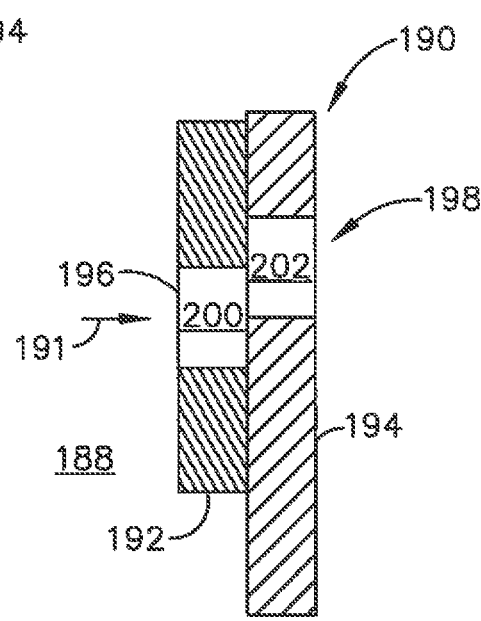
FIG. 5 is an axial sectional illustration of the metering device in FIG. 3 depicting a partially open position.

The first and second metering apertures 200, 202 may be partially open when the metering apertures partially overlap as illustrated in FIG. 5. Variable partial flow through the variable area metering device 190 may be provided by the first and second metering apertures 200, 202 which may be partially open when the metering apertures partially overlap as illustrated in FIG. 5. The metering device 190 may be used in an aircraft gas turbine engine. At takeoff for a high power engine setting, the metering device 190 and the first and second metering apertures 200, 202 may be fully open and the metering apertures fully overlap. At cruise for an intermediate power setting, the metering device 190 and the first and second metering apertures 200, 202 may be partially open and the metering apertures partially overlap. At idle for a low power setting, the metering device 190 and the first and second metering apertures 200, 202 may be fully unopen or fully closed and the metering apertures do not overlap at all, or may be partially open based on the design intent of the system. The variable area metering device 190 may be designed to be fully open, fully closed, or partially open as needed to suit the design intent of any particular system and operating condition.

The first annular plate 192 may optionally be segmented as illustrated in FIGS. 6-9 and include a plurality of first plate segments 219. The second annular plate 194 may also optionally be segmented and include a plurality of second plate segments 220. The contacting second annular plate 194 and first plate segments 219 form a ring. In other embodiments, segments may be utilized in non-annular pipes, channels, ducts, or conduits as well.

Guide pins 210 may be used to center the first annular plate 192 and the plurality of first plate segments 219 around the centerline axis 8 and provide concentricity between the first and second annular plates 192, 194. The guide pins 210 guide and permit differential radial growth and shrinkage between the plates and between the plurality of first plate segments 219 and the second annular plate 194. The guide pins 210 may also be used to retain the plates against each other in an abutting and sliding relationship permitting differential radial growth and shrinkage between the plates. To this end, the guide pins 210 may be fixed to or attached to the second annular plate 194 and extend through radially extending slots 212 in the first plate segments 219 of the first annular plate 192. The guide pins 210 help maintain the radial, axial, and/or circumferential or angular relationship or alignment of the plates and alignment of the first and second metering apertures 200, 202.

A sliding bolted joint 193, such as shown in FIG. 2, may be used to slidingly clamp the first plate segments 219 to the second annular plate 194. Compliant or flexible spring washers 214 may be placed over the guide pins 210 and be secured by a nut or other fastener 218 against the first plate segments 219 to help provide the sliding clamping. The flexible spring washer 214 may be placed over the guide pin 210 and secured by a nut or other fastener 218. Securing the washer 214 to the guide pin 210 helps hold the second annular plate 194 and the first plate segments 219 together. Other types of retainers may be used in place of the pins and washers.

Axially extending retaining pins 222 help retain the angular and radial positions of the first plate segments 219 with respect to the second annular plate 194. The retaining pins 222 may also be used to retain the first plate segments 219 against the second annular plate 194 in an abutting and sliding relationship permitting differential radial growth and shrinkage between the second annular plate 194 and the first plate segments 219. To this end, the retaining pins 222 may be fixed to or attached to the second annular plate 194 and extend through retaining apertures 226, that may be close fitting, extending axially through the first plate segments 219. A spring washer 214 may be placed over the retaining pin 222 and secured by a nut or other fastener 218. Securing the washer 214 to the retaining pin 222 helps hold the first annular plate 192 and the second plate segments 220 together. Other types of retainers may be used in place of the pins and washers.

Figure 6:
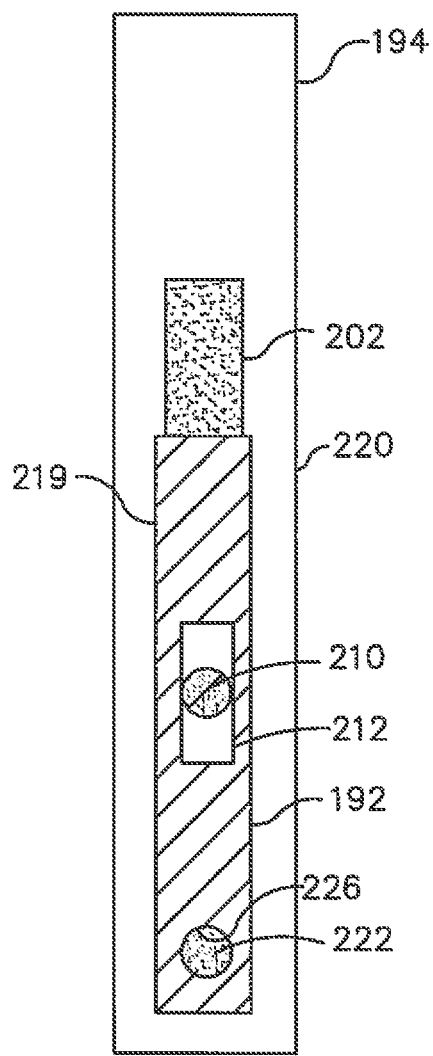
FIG. 6 is an axial sectional illustration of a metering device with at least one segmented plate in a low flow position.
Figure 7:
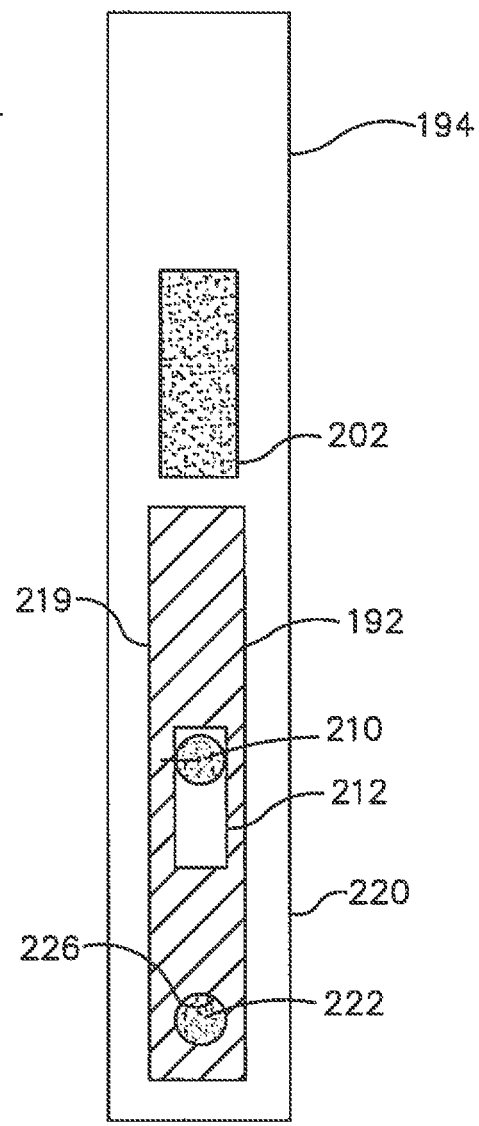
FIG. 7 is an axial sectional illustration of the metering device illustrated in FIG. 6 in a high flow position.
Figure 8:
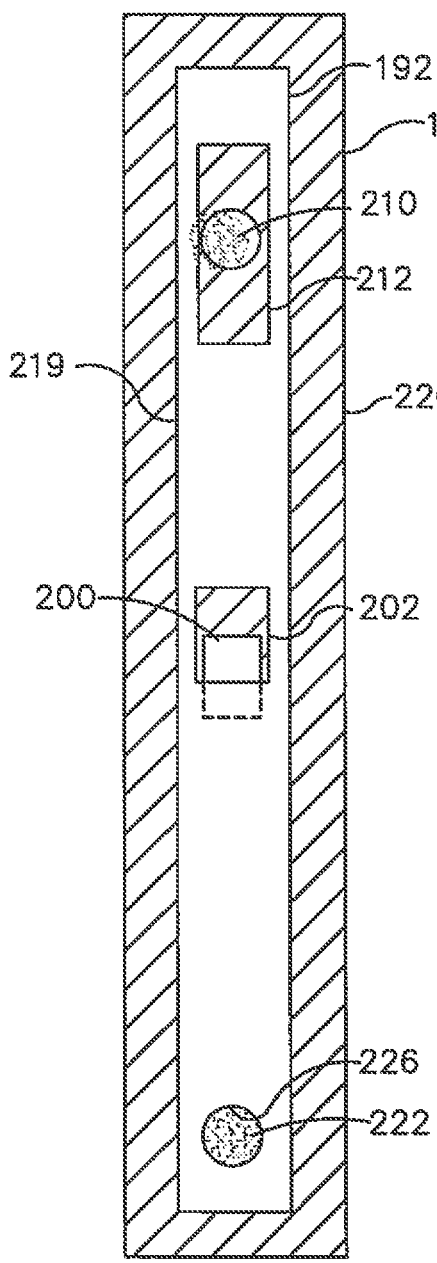
FIG. 8 is an axial sectional illustration of a metering device with at least one segmented plate in a low flow position and apertures in the plates to one side of both guide and retaining pins.
Figure 9:
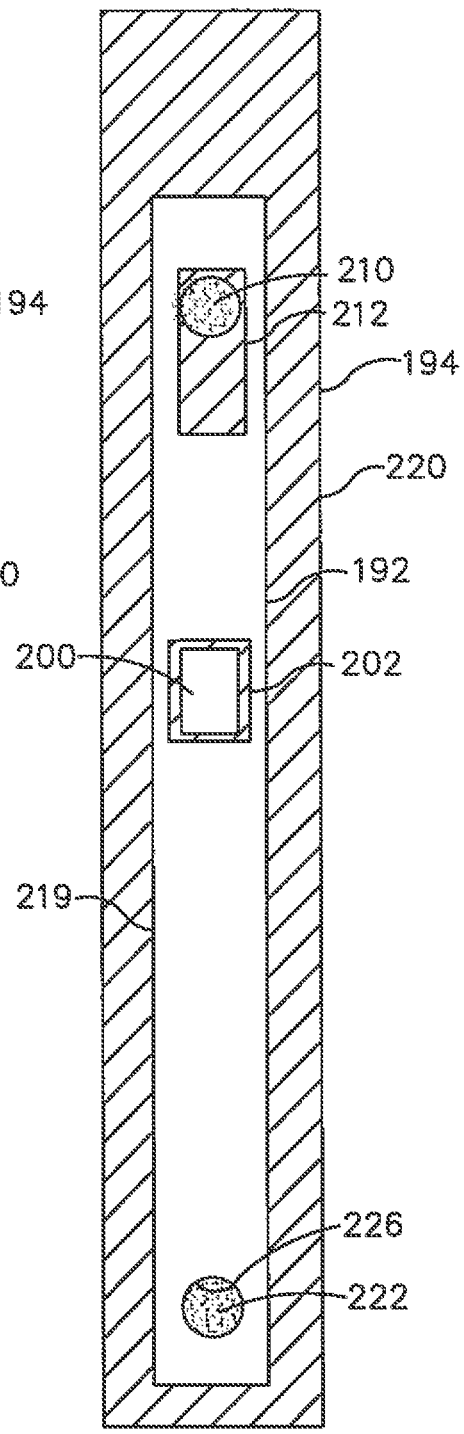
FIG. 9 is an axial sectional illustration of the metering device illustrated in FIG. 8 in a fully open position.

The contacting first annular plate 192 and the second plate segments 220 and their respective first and second apertures 200, 202 may be sized and the apertures positioned to allow the apertures to partially overlap or be partially aligned at a first air temperature T1 of the air 191 through the annular flowpath 188 as illustrated in FIGS. 5, 6, and 8 as may be used during cruise or intermediate power engine operation. The first and second apertures 200, 202 may be sized and positioned to allow the apertures to fully overlap or be fully aligned at a second air temperature T2 of the air 191 through the annular flowpath 188 as illustrated in FIGS. 3, 7, and 9 as may be used during takeoff or high power engine operation. Variable metering of the air 191 through the variable area metering device 190 may be provided by varying the amount overlap between the first and second apertures 200, 202.

The first and second apertures 200, 202 may be positioned radially outwardly of the guide pins 210 and the radially extending slots 212 as illustrated in FIGS. 6 and 7. Alternatively, the first and second apertures 200, 202 may be radially positioned between the guide pins 210 and the retaining pins 222 as illustrated in FIGS. 8 and 9. The contacting first annular plate 192 and the second plate segments 220 in the embodiment of the variable area metering device 190 illustrated in FIGS. 6 and 7 use axially extending guide pins 210 to guide and permit differential radial growth and shrinkage between the plates.

The guide pins 210 may also be used to retain the plate and plate segments against each other in an abutting and sliding relationship permitting differential radial growth and shrinkage between the plate and plate segments. To this end, the guide pins 210 may be fixed to or attached to the first annular plate 192 and extend through a radially extending slots 212 in the second plate segments 220. The guide pins 210 help maintain the circumferential or angular relationship or alignment of the first annular plate 192 and the second plate segments 220 and alignment of the first and second metering apertures 200, 202. As illustrated in FIG. 2, a spring washer 214 may be placed over the guide pin 210 and secured by a nut or other fastener 218. Securing the washer 214 to the guide pin 210 helps hold the plates together. Other types of retainers may be used in place of the pins and washers.

Figure 11:
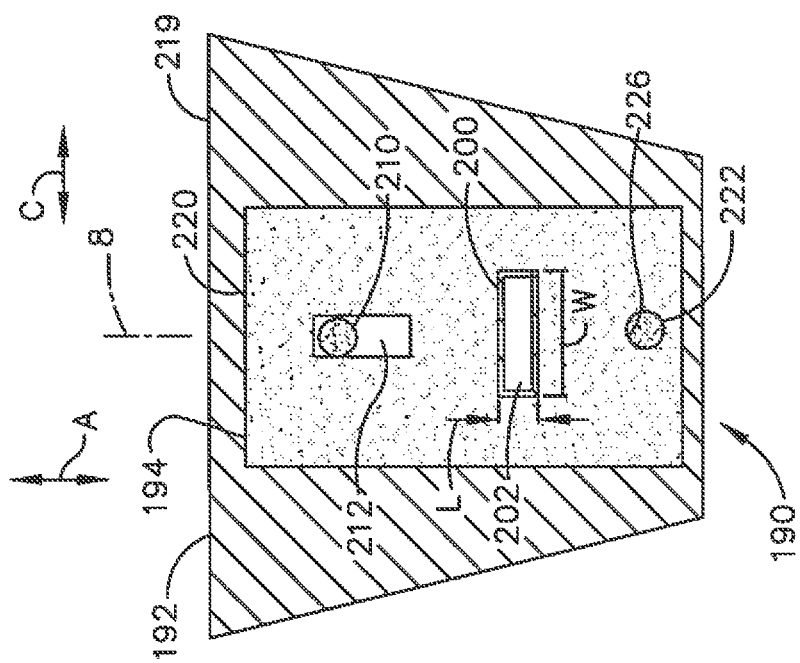
FIG. 11 is a sectional illustration of the metering device illustrated in FIG. 10 in a fully open or high flow position.
Figure 10:
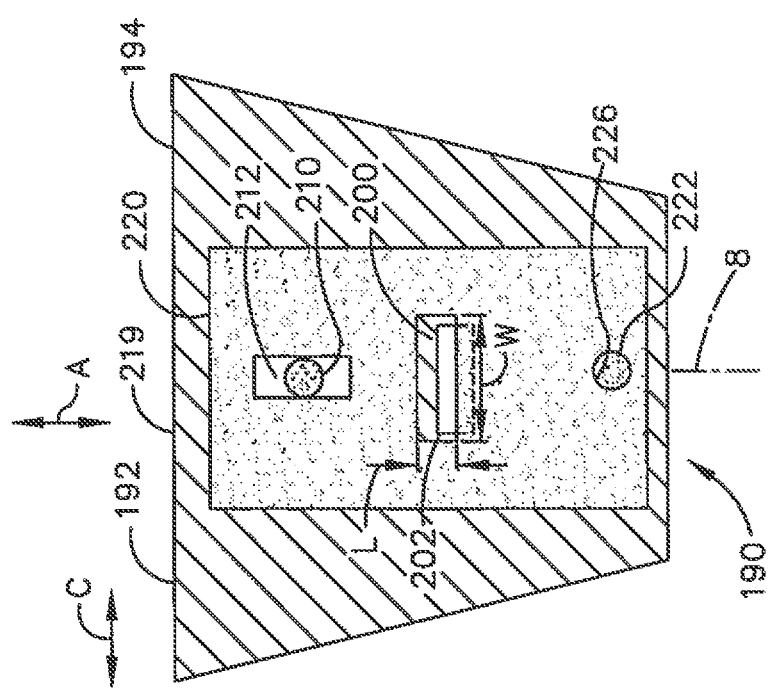
FIG. 10 is a illustration of a metering device with at least one segmented plate in a partially open or low flow position and apertures in the plates circumferentially elongated and axially located between guide and retaining pins.

FIGS. 10 and 11 illustrate first and second apertures 200, 202 having widths W in circumferential direction C that are greater than lengths L in the radial direction RD. This contrasts to the first and second apertures 200, 202 illustrated in FIGS. 6-9 that are the opposite, having widths W in circumferential direction C that are smaller than lengths L in the radial direction RD. The first and second apertures 200, 202 may be curved or circumscribed about a centerline axis 8 such as shown in FIG. 1.

Figure 12:
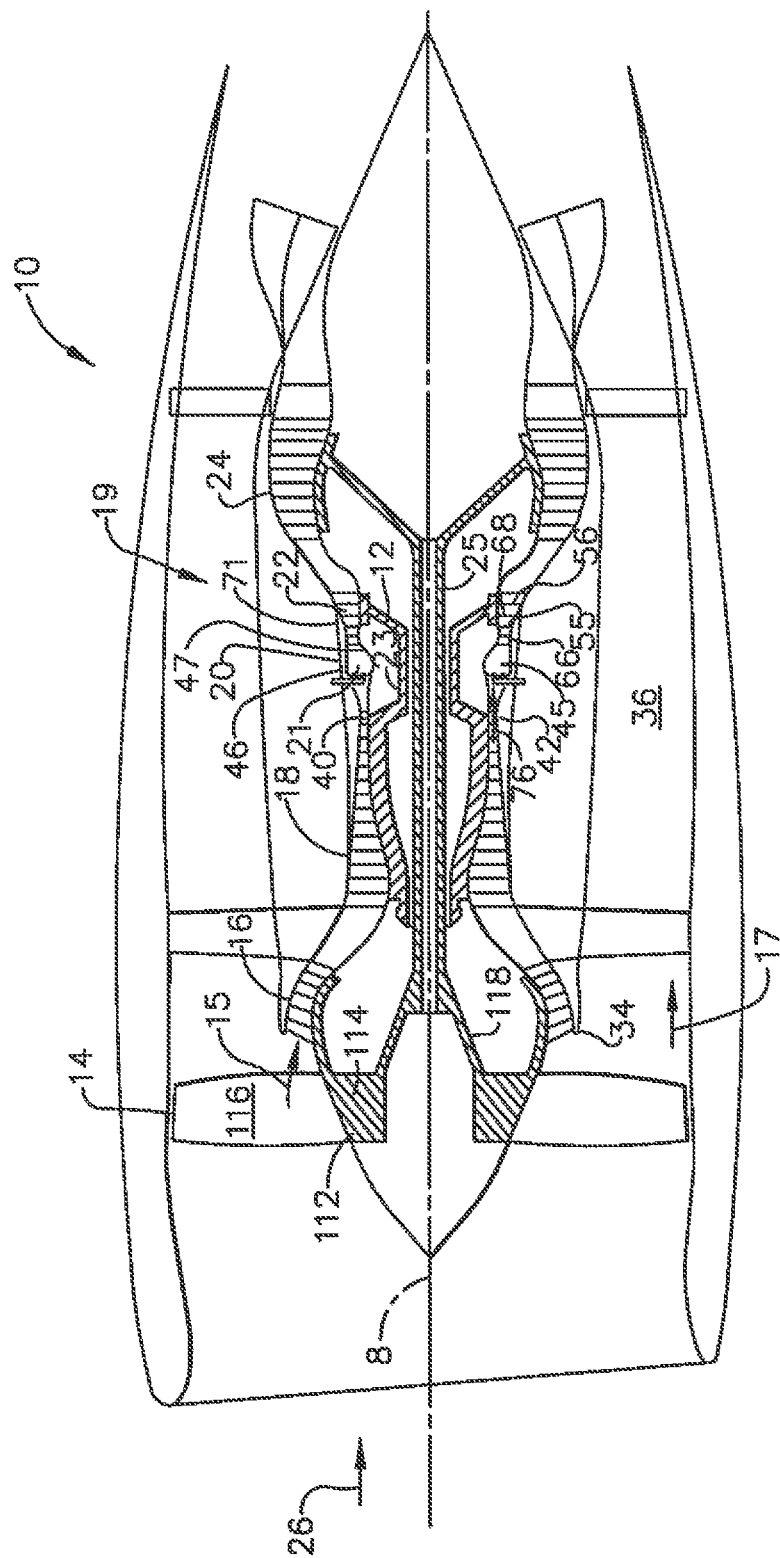
FIG. 12 is an axial cross-sectional illustration of a gas turbine engine suitable for using a metering device as described herein.

Illustrated in FIG. 12 is an exemplary aircraft turbofan gas turbine engine 10 circumscribed about an engine centerline axis 8 and suitably designed to be mounted to a wing or fuselage of an aircraft. The engine 10 includes, in downstream serial flow communication, a fan 14, a low pressure compressor or booster 16, a high pressure compressor (HPC) 18, a combustor 20, a high pressure turbine (HPT) 22, and a low pressure turbine (LPT) 24. The HPT or high pressure turbine 22 is joined by a high pressure drive shaft 23 to the high pressure compressor 18 in what is referred to as a high pressure rotor 12. The LPT or low pressure turbine 24 is joined by a low pressure drive shaft 25 to both the fan 14 and the booster 16. The fan 14 includes a fan rotor 112 having a plurality of circumferentially spaced apart fan blades 116 which extend radially outwardly from a fan disk 114. The fan disk 114 and the low pressure compressor or booster 16 are connected to a fan shaft 118 that is connected to the low pressure drive shaft 25 and is powered by the LPT 24. The high pressure compressor (HPC) 18, combustor 20, and high pressure turbine (HPT) 22 are often referred to as a core engine or gas generator 19 of the engine 10. The combustor 20, high pressure turbine (HPT) 22, and LPT 24 are often referred to as a hot section of the engine 10. A variable area metering device 190 may be used in different cooling flow annular flowpaths.

Referring to FIG. 12, in typical operation, air 26 is pressurized by the fan 14. A flow splitter 34 surrounding the booster 16 immediately behind the fan 14 splits the fan air 26 pressurized by the fan 14 into a radially inner air flow 15 channeled through the booster 16 and a radially outer air flow 17 channeled through a bypass duct 36. The inner air flow 15 is further pressurized by the booster 16. The pressurized air enters the high pressure compressor 18 which further pressurizes the air. The high pressure compressor 18 illustrated herein includes a final high pressure stage 40 which produces what is referred to as compressor discharge pressure (CDP) air 76 which exits the high pressure compressor 18 and passes through a diffuser 42 and into the combustion chamber 45 within the combustor 20 as illustrated in FIG. 13.

Figure 13:
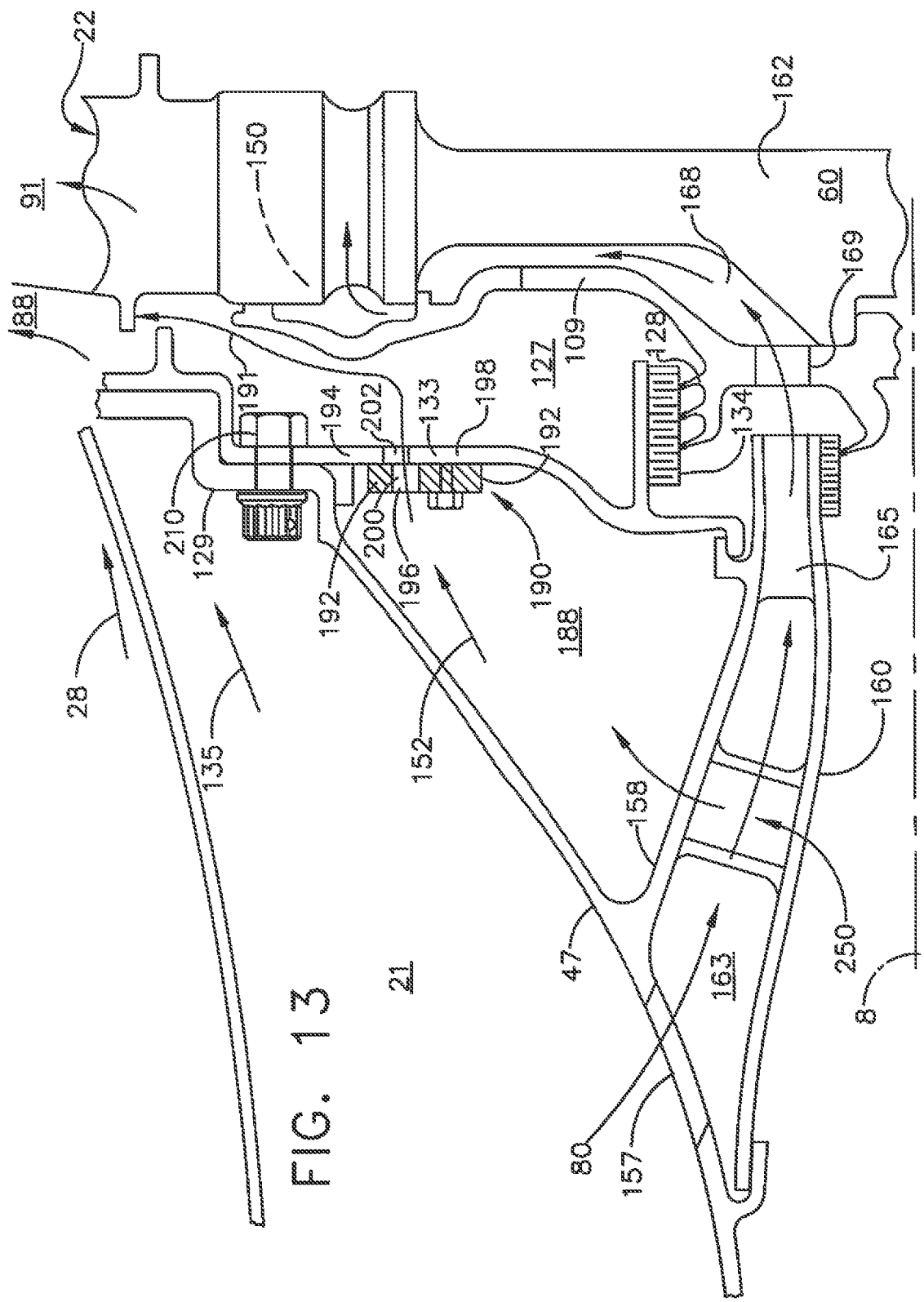
FIG. 13 is an axial cross-sectional illustration of an exemplary embodiment of a metering device described herein used to meter purge flow in an annular cooling flowpath in the hot section of the gas turbine engine illustrated in FIG. 12.

Referring to FIGS. 12 and 13, the compressor discharge pressure (CDP) air 76 flows into a combustion chamber 45 surrounded by annular radially outer and inner combustor casings 46, 47. The combustion chamber 45 includes annular radially outer and inner combustion liners surrounding a combustion zone 21. The pressurized air is mixed with fuel provided by a plurality of fuel nozzles and the mixture ignited in the combustion zone 21 of the combustor 20 to generate hot combustion gases 28 that flow downstream through a hot turbine flowpath 88 of the HPT 22. The combustion produces hot combustion gases 28 and pressure drop through the high pressure turbine 22 causing rotation of the high pressure rotor 12 and then continue downstream for further work extraction in the low pressure turbine 24.

Referring to FIG. 12, in the exemplary embodiment of the engine depicted herein, the high pressure turbine 22 includes, in downstream serial flow relationship, first and second high pressure turbine stages 55, 56 having first and second stage disks. A first stage nozzle 66 is directly upstream of the HPT stage 1 rotor blades and a second stage nozzle 68 is directly upstream of the HPT stage 2 rotor blades. The compressor discharge pressure (CDP) air 76 discharged from the diffuser 42 radially in board from where diffuser 42 is shown in FIG. 12 is used for combustion and to cool components of turbine subjected to the hot combustion gases 28.

Referring to FIGS. 12 and 13, components of turbine cooled by the CDP air 76 include the first stage nozzle 66, a first stage shroud 71 and the first stage disk 60 as well as a first and possibly second stage HPT blade. FIGS. 13-17 illustrate a cooling circuit to cool HPT blades 91. A differential coefficient of thermal expansion (alpha) variable area metering device 190 may be used to meter cooling or thermal control air 191 through an annular flowpath 188 to cool these and other components.

Cooling air apertures 157 in the inner combustor casing 47 allows turbine blade cooling air 80 from the compressor discharge pressure air 76 to flow into an annular cooling air plenum 163 radially disposed between radially outer and inner plenum casings 158, 160. The blade cooling air 80 is accelerated by one or more inducers or accelerators 165 attached to the outer and inner plenum casings 158, 160 at an aft end of the cooling air plenum 163. The accelerators 165 inject the blade cooling air 80 into a stage one disk forward cavity 168 through cooling holes 169 in the retainer plate 109. The stage one disk forward cavity 168 is positioned axially between the retainer plate 109 and the disk web 162 of the first stage disk 60. The accelerators 165 inject and swirl the blade cooling air 80 at a high tangential speed approaching or exceeding wheel speed of the first stage disk 60 at a radial position of the accelerator 165. The blade cooling air 80 then flows through the stage one disk forward cavity 168 and cools the first stage disk 60 and the first stage blades 91. The accelerators 165 also swirl the blade cooling air 80 before it flows through the retainer plate 109 and stage one disk forward cavity 168. A metering device 190 may be located upstream and forward of the accelerators 165 as illustrated in one embodiment in FIG. 14 and as illustrated in another embodiment in FIGS. 15 and 16, depicting fully open and partially closed configurations, and may be used to meter the blade cooling air 80 flowed to the accelerators 165.

Referring to FIG. 13, a metering device 190 may be used to meter purge air 152 from an annular radially inner purge air source 250 radially located between the forward extending annular disk arm and the inner plenum casing 160. The purge air 152 is used to purge a forward cavity 127 axially positioned between the retainer plate 109 and non-rotatable static structure 129 supporting first stage vanes or nozzles 131 of the HPT 22. A purge air path 150 extending axially from an annular purge air plenum 163 through the non-rotatable static structure 129 to the forward cavity 127. The purge air 152 is used to prevent hot flow 135 from the hot turbine flowpath 88 leaking into the forward cavity 127. The forward cavity 127 extends radially inwardly away from the turbine flowpath 88.

The metering device 190 is similar to one illustrated in FIGS. 1-5. The contacting first and second annular plates 192, 194 in the embodiment of the variable area metering device 190 illustrated in FIG. 13 are full unsegmented rings. The first annular plate 192 is the high alpha material plate as illustrated herein and the second annular plate 194 is the low alpha material plate as illustrated herein. The first and second annular plates 192, 194 have first and second annular rows 196, 198 of first and second metering apertures 200, 202 respectively, and are radially disposed about a centerline axis 8.

Axially extending guide pins 210 guide and permit differential radial growth and shrinkage between the plates. The guide pins 210 may also be used to retain the plates against each other in an abutting and sliding relationship permitting differential radial growth and shrinkage between the plates. To this end, the guide pins 210 may be fixed to or attached to the second annular plate 194 and extend through a radially extending slot 212 in the first annular plate 192. The guide pins 210 help maintain the circumferential or angular relationship or alignment of the plates and alignment of the first and second metering apertures 200, 202. The first annular plate 192 is forward or upstream of the second annular plate 194 with respect to a direction of the purge air 152.

The first annular plate 192 is the high alpha material plate and the second annular plate 194 is the low alpha material plate. The second annular plate 194 may be a flange 133, serving as the non-rotatable static structure, and which may support an aft thrust balance land 134 as illustrated in FIG. 13. The flange 133 may be supported by the annular radially inner combustion liner and may be bolted or otherwise attached to the annular radially inner combustion liner.

Figure 14:
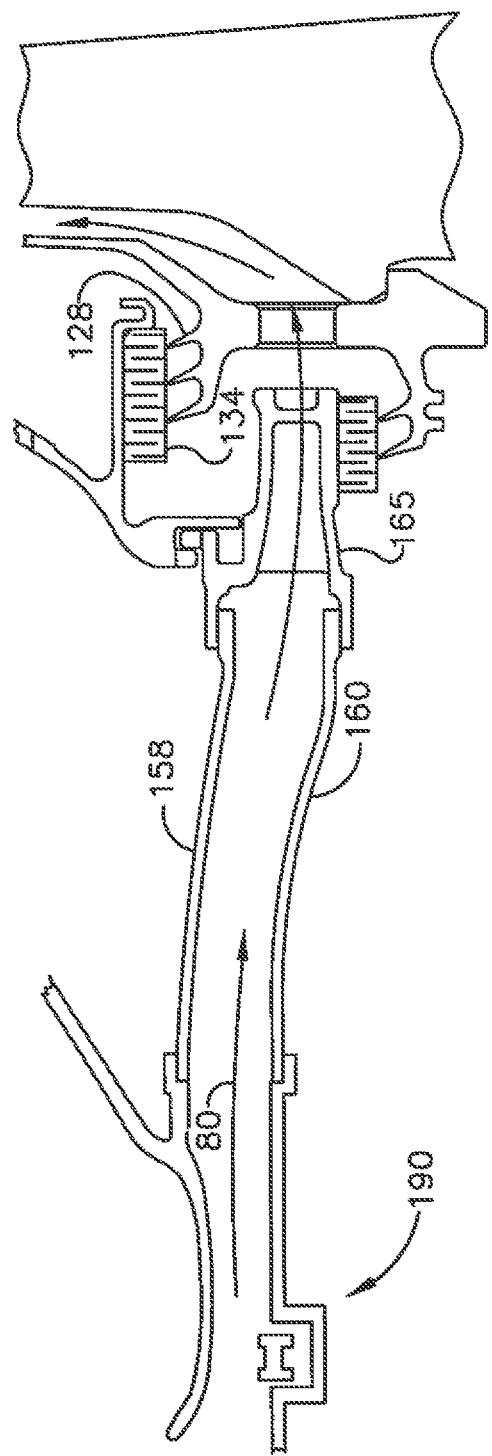
FIG. 14 is an axial cross-sectional illustration of another exemplary embodiment of the metering device in an annular cooling flowpath supplying cooling air axially from a stator to a rotor in the hot section of the gas turbine engine illustrated in FIG. 12.

FIGS. 14, 15, and 16 illustrate a differential coefficient of thermal expansion (alpha) variable area metering device 190 to meter the blade cooling air 80 in the cooling air plenum 163 between the outer and inner plenum casings 158, 160 as illustrated in FIGS. 15 and 16. The metering device 190 is disposed in the cooling air plenum 163 upstream or forward of the inducers or accelerators 165 attached to the outer and inner plenum casings 158, 160 at an aft end of the cooling air plenum 163. The metering device 190 includes a low alpha material ring 264 disposed in a high alpha material annular receptacle 266 in the inner plenum casing 160. The ring 264 and the annular receptacle 266 may have complementary rectangular cross-sections 270. Other complementary cross sectional shapes may be utilized, such as round, rhombus, etc.

The ring 264 serves or functions as the first annular plate 192 described above. At least one first metering aperture 200 radially extends between the ring 264 and the outer plenum casing 158. The annular receptacle 266 includes annular forward and aft walls 272, 274 and a radially inner wall 276 extending therebetween. The aft wall 274 functions as the second annular plate 194. This embodiment of the metering device 190 may include forward and aft guide pins 282, 284 fixed to or attached to the forward and aft walls 272, 274 and extend through radially extending forward and aft grooves 279, 280 in the ring 264. The guide pins 282, 284 help maintain the circumferential or angular relationship or alignment of the ring 264 within the annular receptacle 266 while permitting differential radial growth and shrinkage between the forward and aft walls 272, 274. The low alpha ring 264 grows and shrinks less than the high alpha annular receptacle 266 when the temperature of the blade cooling air 80 in the cooling air plenum 163 changes.

The ring 264 is designed to grow from thermal differences to block a radial portion 286 of a radial width W of the cooling air plenum 163 between the outer and inner plenum casings 158, 160. The cooling air plenum 163 may include a venturi section 290 between the outer and inner plenum casings 158, 160 axially located at or near the ring 264. The venturi section 290 is designed to accelerate velocity of the blade cooling air 80 in the cooling air plenum 163 to improve metering of the blade cooling air 80. The inner plenum casing 160 may be split into forward and aft casing sections 294, 296 including the forward and aft walls 272, 274 respectively. The forward and aft walls 272, 274 are connected such as by bolts 300 which may attach the forward wall 272 to an annular flange 302 depending radially inwardly from the inner wall 276.

FIGS. 15 and 16 illustrate the relative positions and alignment of the ring 264 and the annular receptacle 266 in hot and cool positions respectively. In hot positions the high alpha receptacle 266 grows radially outwardly while the low alpha ring 264 grows less to fully open the radial width W of the cooling air plenum 163 between the outer and inner plenum casings 158, 160 as illustrated in FIG. 15. In cold positions, the high alpha receptacle 266 shrinks radially inwardly while the low alpha ring 264 shrinks less to partially close the radial width W of the cooling air plenum 163 between the outer and inner plenum casings 158, 160 as illustrated in FIG. 16.

Figure 17:
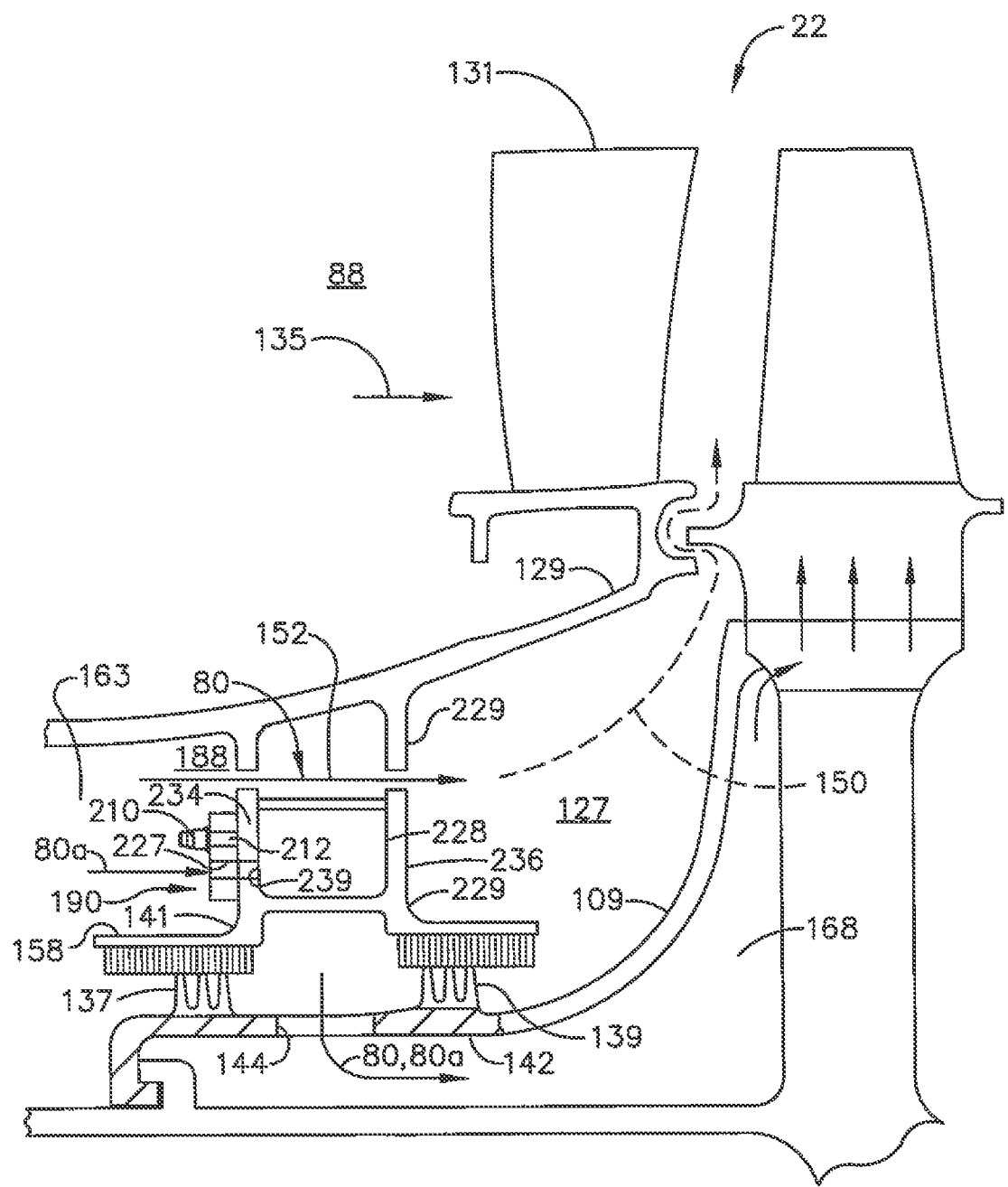
FIG. 17 is an axial cross-sectional illustration of an exemplary embodiment of the metering device in an annular cooling flowpath supplying cooling air radially from a stator to a rotor and purge air in the hot section of the gas turbine engine illustrated in FIG. 12.
Figure 18:
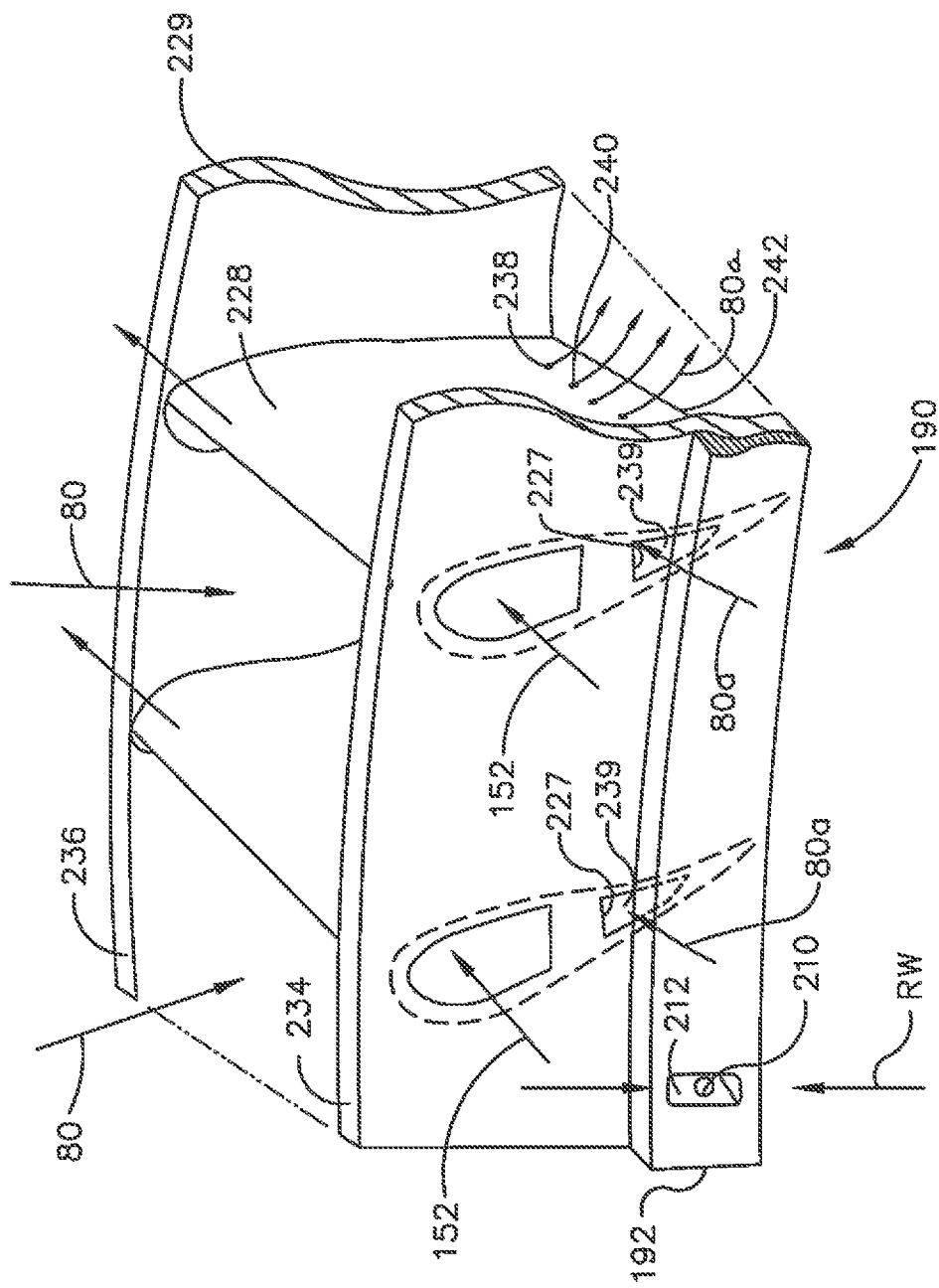
FIG. 18 is a perspective view schematic illustration of vanes used to turn the cooling flow illustrated in FIG. 17.

FIGS. 17 and 18 illustrate an alternative apparatus or assembly for swirling and injecting blade cooling air 80 into the stage one disk forward cavity 168 through cooling holes 144 in the retainer plate 109 and purge air 152 into a forward cavity 127 axially positioned between the retainer plate 109 and the aft annular wall 236 of an annular box 229. The augmented blade cooling air 80a is radially injected from the annular cooling air plenum 163 within the outer plenum casing 158 and through inlet ports 144 in an axially extending hollow annular extension 142 of the retainer plate 109 and into the stage one disk forward cavity 168. The axially extending hollow annular extension 142 surrounds in part the stage one disk forward cavity 168. An open radially inner end 141 of the inwardly open annular box 229 is open to and in fluid flow communication with the inlet ports 144. The annular dual annular forward and aft knife edge seals 137, 139 at the radially inner end 141 of the inwardly open annular box 229 provide a seal between the open radially inner end 141 of the inwardly open annular box 229 and the hollow annular extension 142.

The blade cooling air 80 is accelerated and swirled by an annular array of hollow swirling vanes 228, which may be airfoil shaped, and contained in a radially inwardly open annular box 229. The blade cooling air 80 is swirled by the hollow swirling vanes 228. Blade cooling air 80 is augmented by variable cooling air 80a that passes into the aft cavity of the vane and injected through holes in the airfoil wall or the trailing edge holes (not shown). The blade cooling air 80a is modulated by a differential coefficient of thermal expansion (alpha) variable area metering device 190 through the hollow swirling vanes 228. The swirling vanes 228 are axially disposed between forward and aft annular walls 234, 236 of the annular box 229. The blade cooling air 80a enters the hollow swirling vanes 228 through vane cooling air inlets 227 in the forward annular wall 234. The vane cooling air inlets 227 and the forward annular wall 234 correspond to the second metering apertures 202 and the second annular plate 194 respectively. The augmented blade cooling air 80a exits the swirling vanes 228 through vane cooling air outlets 238 of the swirling vanes 228 located radially inwardly of the vane cooling air inlets 239. The airfoil shaped swirling vanes 228 accelerate the blade cooling air 80 inside vanes. The vane cooling air outlets 238 may be in form of holes 240 in trailing edges 242 of the airfoil shaped swirling vanes 228.

The variable area metering device 190 includes the cooling air inlets 227 in the forward annular wall 234 which may be referenced to as second annular plate and is made of a higher alpha material. The forward annular wall 234 serves as the second annular plate 194 described above. A first annular plate 192 made of a low alpha material plate as illustrated herein as having a radial width RW and radial location that allows it to grow from thermal differences to cover-up some or all of the cooling air inlets 227 in the forward annular wall 234. This provides metering of the augmented blade cooling air 80a entering the vanes. Axially extending guide pins 210 guide and permit differential radial growth and shrinkage between the forward annular wall 234 and an upstream or first annular plate 192. The guide pins 210 may also be used to retain the low alpha plate 192 and the second annular plate 234 against each other in an abutting and sliding relationship permitting differential radial growth and shrinkage between them. To this end, the guide pins 210 may be fixed to or attached to the second annular wall 234 and extend through a radially extending slot 212 in the first annular plate 192. The guide pins 210 maintain the circumferential or angular relationship or alignment of the plates and alignment of the first annular plate 192 and the cooling air inlets 227 which serve as metering apertures. A spring washer 214 may be placed over the guide pin 210 and secured by a nut or other fastener 218 as illustrated in FIG. 2.

Referring to FIGS. 17 and 18, the purge air 152 from the annular cooling air plenum 163 within the plenum casing 158 may also be used to cool and purge a forward cavity 127 axially positioned between the retainer plate 109 and the aft annular wall 236 of the annular box 229. A purge air path 150 extending axially through the inwardly open annular box 229 may be used to provide supply purge air 152 to the forward cavity 127. The purge air 152 is used to prevent hot flow 135 from the hot turbine gas flow of the hot turbine flowpath 88 leaking into the forward cavity 127. The forward cavity 127 extends radially between the hot turbine flowpath 88 and annular aft knife edge seal 139 at the radially inner end 141 of the inwardly open annular box 229 which is part of non-rotatable static structure 129 supporting first stage vanes or nozzles 131 of the HPT 22. The forward cavity 127 also may extend radially between the hot turbine flowpath 88 and the hollow annular extension 142 of the retainer plate 109.

Figure 19:
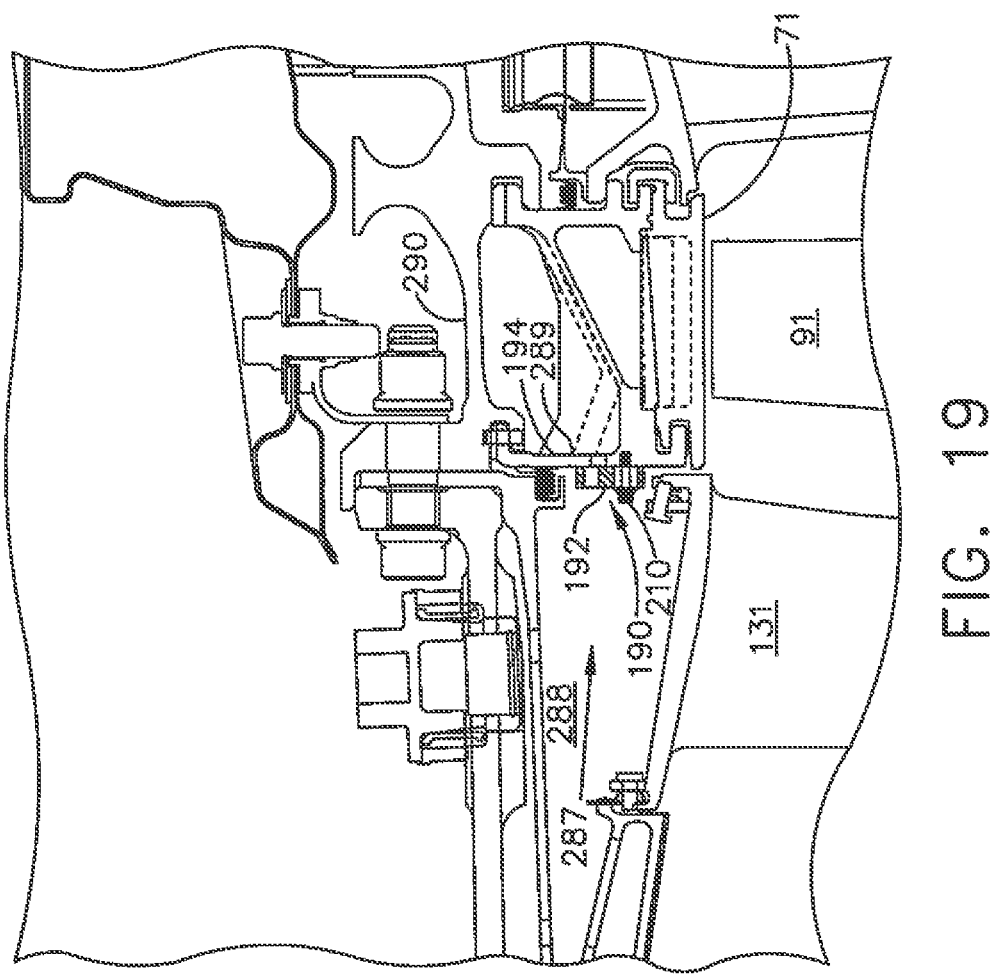
FIG. 19 is an axial sectional illustration of another exemplary embodiment of a metering device in an annular cooling flowpath supplying cooling air to a turbine shroud.

Referring to FIG. 19, the first stage shroud 71 may be cooled by shroud cooling air 287 from a turbine cooling air annular chamber 288. FIG. 19 illustrates the metering device 190 disposed across an aft end of the turbine cooling air annular chamber 288 to meter shroud cooling air to the first stage shroud 71. The contacting first and second annular plates 192, 194 in the embodiment of the variable area metering device 190 illustrated in FIG. 19 are full unsegmented rings. The second annular plate 194 may be a shroud support flange 289 pinned to an HPT outer casing 290 circumscribing the HPT and the centerline axis 8 of the gas turbine engine 10 supporting the shroud 71. The first annular plate 192 is the low alpha material plate as illustrated herein and the second annular plate 194 is the high alpha material plate as illustrated herein. The first and second annular plates 192, 194 have first and second annular rows 196, 198 of first and second metering apertures 200, 202 respectively, and are radially disposed about the centerline axis 8 of the gas turbine engine 10.

Axially extending guide pins 210 guide and permit differential radial growth and shrinkage between the plates. The guide pins 210 may also be used to retain the plates against each other in an abutting and sliding relationship permitting differential radial growth and shrinkage between the plates. To this end, the guide pins 210 may be fixed to or attached to the second annular plate 194 and extend through a radially extending slot 212 in the first annular plate 192. The guide pins 210 help maintain the circumferential or angular relationship or alignment of the plates and alignment of the first and second metering apertures 200, 202. The first annular plate 192 is forward or upstream of the second annular plate 194 with respect to the annular flowpath 288. In this example, the first annular plate 192 is the low alpha material plate and the second annular plate 194 is the high alpha material plate.

Various characteristics, aspects, and advantages of the present disclosure may also be embodied in any permutation of aspects of the disclosure, including but not limited to the following technical solutions as defined in the enumerated aspects:

1. An annular fluid flow control or metering device comprising: first and second annular plates disposed in an annular flow path, the first annular plate and second annular plates being made of different first and second materials, the first annular plate having a lower first coefficient of thermal expansion than a second coefficient of thermal expansion of the second annular plate, the first annular plate abutting or in contact with the second annular plate, the first annular plate including at least one first metering aperture, and the second annular plate being more thermally responsive than the first annular plate wherein the second annular plate being configured to radially grow and shrink to at least partly obstruct the at least one first metering aperture for metering or controlling a flow of fluid through the at least one first metering aperture.

2. The device of aspect 1, further comprising axially extending guide pins disposed between the first and second annular plates for maintaining circumferential or angular relationship or alignment of the first and second annular plates.

3. The device of aspects 1-2, further comprising axially extending guide pins fixed to or attached to the second annular plate and the axially extending guide pins extending through radially extending slots in the first annular plate.

4. The device of aspects 2-3, further comprising compliant washers placed over the guide pins and secured by a nut or other fastener against the first annular plate.

5. The device of aspects 1-4, further comprising the second annular plate including at least one second metering aperture.

6. The device of aspect 5, further comprising:
axially extending guide pins disposed between the first and second annular plates for maintaining circumferential or angular relationship or alignment of the first and second annular plates,
axially extending guide pins fixed to or attached to the second annular plate, and
the axially extending guide pins extending through radially extending slots in the first annular plate.

7. The device of aspect 1, further comprising:
the first annular plate including a first annular row of first metering apertures including the at least one first metering aperture,
the second annular plate including a second annular row of second metering apertures, and
the second annular plate being more thermally responsive than the first annular plate wherein the second annular plate being configured to radially grow and shrink to at least partly align the first and second metering apertures respectively.

8. The device of aspects 1-7, further comprising one or both of the first and second annular plates being segmented into first and second pluralities of first and second plate segments respectively.

9. The device of aspect 1, further comprising:
the first annular plate being segmented into a first plurality of first plate segments,
the first plurality of first plate segments including a first plurality of first metering apertures including the at least one first metering aperture,
axially extending guide pins fixed to or attached to the second annular plate and extending through radially extending slots in the first plate segments, and
axially extending retaining pins fixed to or attached to the second annular plate and extending through retaining apertures extending axially through the first plate segments.

10. The device of aspect 9, further comprising:
the second annular plate including a second annular row of second metering apertures,
the second annular plate being more thermally responsive than the first annular plate wherein the second annular plate being configured to radially grow and shrink to at least partly align the first and second metering apertures respectively,
the axially extending guide pins and the radially extending slots positioned radially inwardly of the axially extending retaining pins and the retaining apertures, and
the second metering apertures positioned radially outwardly of the guide pins or the second metering apertures positioned radially between the guide pins and the axially extending retaining pins and the retaining apertures.

11. The device of aspects 1-10, further comprising the first and second apertures having widths (W) in a circumferential direction (C), lengths (L) in a radial direction (A), and the widths (W) being less or greater than lengths (L).

12. An aircraft turbofan gas turbine engine comprising:
a core engine or gas generator including a high pressure compressor, a combustor, and a high pressure turbine,
one or more annular fluid flow control or metering devices disposed in one or more corresponding annular flowpaths in the core engine or gas generator,
each of the metering devices including first and second annular plates disposed in an annular flow path,
the first annular plate and second annular plates being made of different first and second materials,
the first annular plate having a lower first coefficient of thermal expansion than a second coefficient of thermal expansion of the second annular plate,
the first annular plate abutting or in contact with the second annular plate,
the first annular plate including at least one first metering aperture, and
the second annular plate being more thermally responsive than the first annular plate wherein the second annular plate being configured to radially grow and shrink to at least partly obstruct the at least one first metering aperture for metering or controlling a flow of fluid through the at least one first metering aperture.

13. The engine of aspect 12, further comprising axially extending guide pins disposed between the first and second annular plates for maintaining circumferential or angular relationship or alignment of the first and second annular plates and axially extending guide pins fixed to or attached to the second annular plate and the axially extending guide pins extending through radially extending slots in the first annular plate.

14. The engine of aspect 12, further comprising:
the one or more corresponding annular flow paths in cooling supply relationship with the high pressure turbine,
the high pressure turbine including a turbine first stage disk,
a radially inwardly open annular box in one of the one or more corresponding annular flow paths,
the radially inwardly open annular box operable for swirling and injecting blade cooling air from the one of the one or more corresponding annular flow paths into a turbine stage one disk forward cavity positioned axially between a retainer plate and a disk web of the turbine first stage disk,
an annular array of hollow swirling vanes axially disposed between forward and aft annular walls of the annular box wherein the forward annular walls being the second annular plate and the second metering apertures being vane cooling air inlets into the hollow swirling vanes,
vane cooling air outlets in the hollow swirling vanes and in fluid communication with the vane cooling air inlets, and
the vane cooling air inlets located radially inwardly of the vane cooling air inlets.

15. The engine of aspect 14, further comprising:
the radially inwardly open annular box including an open radially inner end open to and in fluid flow communication with inlet ports in a hollow annular extension of retainer plate,
the hollow annular extension surrounding in part the turbine stage one disk forward cavity, and
annular dual annular forward and aft knife edge seals provides a seal between the radially inner end of the inwardly open annular box and the hollow annular extension.

16. The engine of aspect 14, further comprising:
a forward cavity axially positioned between the retainer plate and the aft annular wall of the annular box,
the forward cavity extending radially between a hot turbine flowpath of the high pressure turbine and the hollow annular extension of the retainer plate, and
a purge air path extending axially through the inwardly open annular box to the forward cavity.

17. The engine of aspect 12, further comprising:
the high pressure turbine including a turbine first stage disk,
a turbine stage one disk forward cavity positioned axially between a retainer plate and a disk web of the turbine first stage disk,
a forward cavity axially positioned between the retainer plate and non-rotatable static structure of the high pressure turbine,
the forward cavity extending radially inwardly from a hot turbine flowpath of the high pressure turbine,
the one or more corresponding annular flow paths including a purge air path extending axially through the non-rotatable static structure to the forward cavity, and
one of the metering devices disposed in the purge air path and supported in the non-rotatable static structure.

18. The engine of aspect 17, further comprising:
the non-rotatable static structure including the second annular plate,
a second annular row of second metering apertures in the second annular plate, and
the second annular plate being a flange bolted or otherwise attached to an annular radially inner combustion liner of the combustor.

19. The engine of aspect 12, further comprising:
the one or more corresponding annular flow paths in cooling supply relationship with the high pressure turbine,
the high pressure turbine including a turbine first stage disk,
an annular cooling air plenum in fluid supply communication with one or more inducers or accelerators attached to radially outer and inner plenum casings at an aft end of the cooling air plenum, and
the one or more inducers or accelerators being configured for injecting and/or swirling blade cooling air from the annular cooling air plenum into a turbine stage one disk forward cavity positioned axially between a retainer plate and a disk web of the turbine first stage disk.

20. The engine of aspect 19, further comprising:
the first annular plate including a low alpha material ring,
the low alpha material ring being disposed in a high alpha material annular receptacle in the inner plenum casing, and
the high alpha annular receptacle including annular forward and aft walls and a radially inner wall extending between the annular forward and aft walls,
wherein the aft wall includes the second annular plate, and
wherein the low alpha material ring and the high alpha material annular receptacle have complementary cross-sections.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

What is claimed is:

1. An annular fluid flow control or metering device for a turbofan gas turbine engine, the annular fluid flow control or metering device comprising:
first and second annular plates disposed in an annular flow path,
wherein the first annular plate and the second annular plate is made of different first and second materials,
wherein the first annular plate has a lower first coefficient of thermal expansion than a second coefficient of thermal expansion of the second annular plate,
wherein the first annular plate abuts or is in contact with the second annular plate,
wherein the first annular plate includes at least one first metering aperture,
wherein the second annular plate is more thermally responsive than the first annular plate,
wherein the second annular plate is configured to radially grow and shrink to at least partly obstruct the at least one first metering aperture for metering or controlling a flow of fluid through the at least one first metering aperture, and
wherein the first annular plate and the second annular plate are disposed at an axial position forward of at least one blade or nozzle stage of a turbine section of the turbofan gas turbine engine.

2. The annular fluid flow control or metering device as claimed in claim 1, further comprising axially extending guide pins disposed between the first and second annular plates for maintaining circumferential or angular relationship or alignment of the first and second annular plates.

3. The annular fluid flow control or metering device as claimed in claim 1, further comprising axially extending guide pins fixed to or attached to the second annular plate and the axially extending guide pins extending through radially extending slots in the first annular plate.

4. The annular fluid flow control or metering device as claimed in claim 1, further comprising the second annular plate including at least one second metering aperture.

5. The annular fluid flow control or metering device as claimed in claim 4, further comprising:
   axially extending guide pins disposed between the first and second annular plates for maintaining circumferential or angular relationship or alignment of the first and second annular plates,
   axially extending guide pins fixed to or attached to the second annular plate, and
   the axially extending guide pins extending through radially extending slots in the first annular plate.

6. The annular fluid flow control or metering device as claimed in claim 1, further comprising:
   the first annular plate including a first annular row of first metering apertures including the at least one first metering aperture,
   the second annular plate including a second annular row of second metering apertures, and
   the second annular plate being more thermally responsive than the first annular plate wherein the second annular plate being configured to radially grow and shrink to at least partly align the first and second metering apertures respectively.

7. The annular fluid flow control or metering device as claimed in claim 1, further comprising one or both of the first and second annular plates being segmented into first and second pluralities of first and second plate segments respectively.

8. The annular fluid flow control or metering device as claimed in claim 1, further comprising:
   the first annular plate being segmented into a first plurality of first plate segments,
   the first plurality of first plate segments including a first plurality of first metering apertures including the at least one first metering aperture,
   axially extending guide pins fixed to or attached to the second annular plate and extending through radially extending slots in the first plate segments, and
   axially extending retaining pins fixed to or attached to the second annular plate and extending through retaining apertures extending axially through the first plate segments.

9. The annular fluid flow control or metering device as claimed in claim 8, further comprising:
   the second annular plate including a second annular row of second metering apertures,
   the second annular plate being more thermally responsive than the first annular plate wherein the second annular plate being configured to radially grow and shrink to at least partly align the first and second metering apertures respectively,
   the axially extending guide pins and the radially extending slots positioned radially inwardly of the axially extending retaining pins and the retaining apertures, and
   the second metering apertures positioned radially outwardly of the guide pins or the second metering apertures positioned radially between the guide pins and the axially extending retaining pins and the retaining apertures.

10. The annular fluid flow control or metering device as claimed in claim 9, further comprising the first and second apertures having widths (W) in a circumferential direction (C), lengths (L) in a radial direction (A), and the widths (W) being less or greater than lengths (L).

11. An annular fluid flow control or metering device comprising:
   first and second annular plates disposed in an annular flow path,
   axially extending guide pins fixed to or attached to the second annular plate and the axially extending guide pins extending through radially extending slots in the first annular plate, and
   compliant washers placed over the guide pins and secured by a nut or other fastener against the first annular plate,
   the first annular plate and second annular plates being made of different first and second materials,
   the first annular plate having a lower first coefficient of thermal expansion than a second coefficient of thermal expansion of the second annular plate,
   the first annular plate abutting or in contact with the second annular plate,
   the first annular plate including at least one first metering aperture,
   the second annular plate being more thermally responsive than the first annular plate wherein the second annular plate being configured to radially grow and shrink to at least partly obstruct the at least one first metering aperture for metering or controlling a flow of fluid through the at least one first metering aperture.

* * * * *